United States Patent
Ruther et al.

(10) Patent No.: US 10,559,431 B2
(45) Date of Patent: Feb. 11, 2020

(54) HIGH VOLTAGE WINDOW ELECTROLYTE FOR SUPERCAPACITORS

(71) Applicant: UT-BATTELLE, LLC, Oak Ridge, TN (US)

(72) Inventors: Rose E. Ruther, Oak Ridge, TN (US); Frank M. Delnick, Maryville, TN (US); Jagjit Nanda, Knoxville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 0 days.

(21) Appl. No.: 15/806,693

(22) Filed: Nov. 8, 2017

(65) Prior Publication Data
US 2018/0130611 A1    May 10, 2018

Related U.S. Application Data

(60) Provisional application No. 62/419,141, filed on Nov. 8, 2016.

(51) Int. Cl.
| | |
|---|---|
| *H01G 11/60* | (2013.01) |
| *H01G 11/04* | (2013.01) |
| *H01G 11/62* | (2013.01) |
| *H01G 11/24* | (2013.01) |
| *H01G 11/84* | (2013.01) |

(Continued)

(52) U.S. Cl.
CPC ............. *H01G 11/60* (2013.01); *H01G 11/04* (2013.01); *H01G 11/24* (2013.01); *H01G 11/32* (2013.01); *H01G 11/62* (2013.01); *H01G 11/84* (2013.01); *H01G 11/06* (2013.01); *H01G 11/38* (2013.01); *Y02E 60/13* (2013.01)

(58) Field of Classification Search
CPC ........ H01G 11/54; H01G 11/58; H01G 11/60; H01G 11/62; H01G 11/32
See application file for complete search history.

(56) References Cited

U.S. PATENT DOCUMENTS

| | | | | |
|---|---|---|---|---|
| 5,051,325 A | * | 9/1991 | Shishikura | H01M 4/131 252/182.1 |
| 6,222,720 B1 | * | 4/2001 | Aoki | H01G 9/155 361/301.1 |
| 6,411,496 B1 | * | 6/2002 | Suhara | H01G 9/02 361/502 |

OTHER PUBLICATIONS

M. Hahn et al.: "Carbon based double layer capacitors with aprotic electrolyte solutions: the possible role of intercalation/insertionprocesses", Appl. Phys. A 82, 633-638 (2006). DOI: 10.1007/s00339-3403-1.

(Continued)

*Primary Examiner* — Eric W Thomas
(74) *Attorney, Agent, or Firm* — Fox Rothschild LLP

(57) ABSTRACT

A supercapacitor according to the present invention includes a negative carbon-comprising electrode which does not intercalate sodium, and a positive carbon-comprising electrode. An electrolyte composition comprises sodium hexafluorophosphate and a non-aqueous solvent comprising at least one selected from the group consisting of ethylene glycol dimethyl ether, diethylene glycol dimethyl ether, triethylene glycol dimethyl ether, and tetraethylene glycol dimethyl ether. The supercapacitor has an electrochemical voltage window of from +0.0 V to 3.5 V (full cell voltage). The electrolyte has an electrochemical voltage window of from +0.05 V to 3.9 V vs. Na/Na+. A method of making and a method of operating a supercapacitor is also disclosed.

7 Claims, 14 Drawing Sheets

(51) Int. Cl.
    H01G 11/32    (2013.01)
    H01G 11/38    (2013.01)
    H01G 11/06    (2013.01)

(56) References Cited

OTHER PUBLICATIONS

M. Nie et al.: "Role of Solution Structure in Solid Electrolyte Interphase Formation on Graphite with LiPF6 in Propylene Carbonate" J. Phys. Chem. C 2013, 1177, 25381-25389. Dx.doi.org/10.1021/p409765w.
Y. Yamada et al.: "Review-Superconcentrated Electrolytes for Lithium Batteries", J. Electrochem. Soc., 162(14) A2406-A2423 (2015).
T. Mandai et al.: "Phase Diagrams and Solvate Structures of Binary Mixtures of Glymes and Na Salts", J. Phys. Chem. B 2013, 117, 15072-15085. Dx.doi.org/10.1021/jp407582m.
T. Mandai et al.: "E?ect of Ionic Size on Solvate Stability of Glyme-Based Solvate Ionic Liquids" J. Phys. Chem. B 2015, 119, 1523-1534. DOI:10.1021/jp508100s.
P. Han et al.: "High energy density sodium-ion capacitors through co-intercalation mechanism in diglyme-based electrolyte system", J. Power Sources 297 (2015) 457-463.
B. Jache et al.: "Use of Graphite as a Highly Reversible Electrode with Superior Cycle Life for Sodium-Ion Batteries by Making Use of Co-Intercalation Phenomena", Chem. Int. Ed. 2014, 53, 10169-10173. DOI: 10.1002/anie.201403734.
H. Kim et al.: "Sodium Storage Behavior in Natural Graphite using Ether-based Electrolyte Systems", Adv. Funct. Mater. 2015, 25, 534-541. DOI:101002/adfm.201402984.
Y. Yamada et al.: "General Observation of Lithium Intercalation into Graphite in Ethylene-Carbonate-Free Superconcentrated Electrolytes", ACS Appl. Mater. Interfaces 2014, 6, 10892-10899, dx.doi.org/10.1021/am5001163.
P.W. Ruch et al.: "Aging of electrochemical double layer capacitors with acetonitrile-based electrolyte at elevated voltages", Electrochim. Acta 55 (2010) 4412-4420.
P.W. Ruch et al: "A comparison of the aging of electrochemical double layer capacitors with acetonitrile and propylene carbonate-based electrolytes at elevated voltages", D. Cericola, A. Foelske, R. Kotz and A. Wokuan, Electrochi. Acta 55 (2010) 2352-2357.
X. Kang et al.: "Quaternary Onium Salts as Nonaqueous Electrolytes for Electrochemical Capacitors", M.S. Ding and R. Jow, J. Electrochem. Soc., 148(3) (2001) A267.
Kotz, R.; Carlen, M., Principles and applications of electrochemical capacitors. Electrochimica Acta 2000, 45 (15-16), 2483-2498.
Pandolfo, A. G.; Hollenkamp, A. F., Carbon properties and their role in supercapacitors. J. Power Sources 2006, 157 (1), 11-27.
Simon, P.; Gogotsi, Y., Materials for electrochemical capacitors. Nature Materials 2008, 7 (11), 845-854.
Frackowiak, E.; Beguin, F., Carbon materials for the electrochemical storage of energy in capacitors. Carbon 2001, 39 (6), 937-950.
Conway, B. E.; Pell, W. G., Double-layer and pseudocapacitance types of electrochemical capacitors and their applications to the development of hybrid devices. J. Solid State Electrochem. 2003, 7 (9), 637-644.
Toupin, M.; Brousse, T.; Belanger, D., Charge storage mechanism of Mn02 electrode used in aqueous electrochemical capacitor. Chemistry of Materials 2004, 16 (16), 3184-3190.
Pognon, G.; Brousse, T.; Demarconnay, L; Belanger, D., Performance and stability of electrochemical capacitor based on anthraquinone modified activated carbon. J. Power Sources 2011, 196 (8), 4117-4122.
Augustyn, V.; Simon, P.; Dunn, B., Pseudocapacitive oxide materials for high-rate electrochemical energy storage. Energy Environ. Sc!. 2014, 7 (5), 1597-1614.
House, H. 0.; Feng, E; Peet, N. P., Comparison of Various Tetraalkylammonium Salts as Supporting Electrolytes in Organic Electrochemical Reactions. J. Org. Chem. 1971, 36 (16), 2371-&.
Ue, M.; Ida, K.; Mori, S., Electrochemical Properties of Organic Liquid Electrolytes Based on Quaternary Onium Salts for Electrical Double-Layer Capacitors. Journal of the Electrochemical Society 1994,14/ (11), 2989-2996.
Winter, M.; Brodd, R. J., What are batteries, fuel cells, and supercapacitors? Chem. Rev. 2004, 104 (10), 4245-4269.
Beguin, F.; Presser, V.; Balducci, A.; Frackowiak, E., Carbons and Electrolytes for Advanced Supercapacitors. Advanced Materials 2014, 26 (14), 2219-2251.
Kotz, R.; Hahn, M.; Gallay, R., Temperature behavior and impedance fundamentals of supercapacitors. J. Power Sources 2006, 154 (2), 550-555.
Bohlen, O.; Kowal, I.; Sauer, D. U., Ageing behaviour of electrochemical double layer capacitors Part I. Experimental study and ageing model. J. Power Sources 2007, 172 (1), 468-475.
McEwen, A. B.; Ngo, H. L; LeCompte, K.; Goldman, J. L., Electrochemical properties of imidazolium salt electrolytes for electrochemical capacitor applications. Journal of the Electrochemical Society 1999, /46 (5), 1687-1695.
Lewandowski, A.; Galinski, M., Carbon-ionic liquid double-layer capacitors. Journal of Physics and Chemistry of Solids 2004, 65 (2-3), 281-286.
Galinski, M.; Lewandowski, A.; Stepniak, I., Ionic liquids as electrolytes. Electrochimica Acta 2006, 51 (26), 5567-5580.
Brandt, A.; Isken, P.; Lex-Balducci, A.; Balducci, A., Adiponitrile-based electrochemical double layer capacitor. J. Power Sources 2012, 204, 213-219.
Brandt, A.; Balducci, A., The Influence of Pore Structure and Surface Groups on the Performance of High Voltage Electrochemical Double Layer Capacitors Containing Adiponitrile-Based Electrolyte. Journal of the Electrochemical Society 2012, 159 (12), A2053-A2059.
Chiba, K.; Ueda, T.; Yamaguchi, Y.; Oki, Y.; Shimodate, F.; Naoi, K., Electrolyte Systems for High Withstand Voltage and Durability I. Linear Sulfones for Electric Double-Layer Capacitors. Journal of the Electrochemical Society 2011, 158 (8), A872-A882.
Chiba, K.; Ueda, T.; Yamaguchi, Y.; Oki, Y.; Saiki, F.; Naoi, K., Electrolyte Systems for High Withstand Voltage and Durability II. Alkylated Cyclic Carbonates for Electric Double-Layer Capacitors. Journal of the Electrochemical Society 2011, 158 (12), A1320-A1327.
Burke, A., R&D considerations for the performance and application of electrochemical capacitors. Electrochimica Acta 2007, 53 (3), 1083-1091.
Azais, P.; Duclaux, L.; Florian, P.; Massiot, D.; Lillo-Rodenas, M. A.; Linares-Solano, A.; Peres, J. P.; Jehoulet, C.; Beguin, E, Causes of supercapacitors ageing in organic electrolyte. J. Power Sources 2007, 171 (2), 1046-1053.
Ruch, P. W.; Cericola, D.; Foelske-Schmitz, A.; Katz, R.; Wokaun, A., Aging of electrochemical double layer capacitors with acetonitrile-based electrolyte at elevated voltages. Electrochimica Acta 2010, 55 (15), 4412-4420.
Ruch, P. W.; Cericola, D.; Foelske, A.; Kotz, R.; Wokaun, A., A comparison of the aging of electrochemical double layer capacitors with acetonitrile and propylene carbonate-based electrolytes at elevated voltages. Electrochimica Acta 2010, 55 (7), 2352-2357.
Bittner, A. M.; Zhu, M.; Yang, Y.; Waibel, H. F.; Konuma, M.; Starke, U.; Weber, C. J., Ageing of electrochemical double layer capacitors. J. Power Sources 2012, 203, 262-273.
Hahn, M.; Barbieri, O.; Gallay, R.; Kotz, R., A dilatometric study of the voltage limitation of carbonaceous electrodes in a protic EDLC type electrolytes by charge-induced strain. Carbon 2006, 44 (12), 2523-2533.
Zhang X.; Kuhnel, R. S.; Passerini, S.; Balducci, A., "Double-Salt" Electrolytes for High Voltage Electrochemical Double-Layer Capacitors. J. Solut. Chem. 2015, 44 (3-4), 528-537.
Kuhnel, R. S.; Reiter, J.; Jeong, S.; Passerini, S.; Balducci, A., Anodic stability of aluminum current collectors in an ionic liquid based on the (fluorosulfonyl)(trifluoromethanesulfonyl)imide anion and its implication on high voltage supercapacitors. Electrochem. Commun. 2014, 38, 117-119.

(56) References Cited

OTHER PUBLICATIONS

Kuhnel, R. S.; Balducci, A., Comparison of the anodic behavior of aluminum current collectors in imide-based ionic liquids and consequences on the stability of high voltage supercapacitors. J. Power Sources 2014, 249, 163-171.

Kuhnel, R. S.; Lubke, M.; Winter, M.; Passerini, S.; Balducci, A., Suppression of aluminum current collector corrosion in ionic liquid containing electrolytes. J. Power Sources 2012, 214, 178-184.

Aurbach, D.; Daroux, M.; Faguy, P.; Yeager, E., The Electrochemistry of Noble-Metal Electrodes in Aprotic Organic-Solvents Containing Lithium-Salts. J. Electroanal. Chem. 1991, 297 (1), 225-244.

Aurbach, D.; Moshkovich, M.; Cohen, Y.; Schechter, A., The study of surface film formation on noble-metal electrodes in alkyl carbonates/Li salt solutions, using simultaneous in situ AFM, EQCM, FTIR, and EIS. Langmuir 1999, 15 (8), 2947-2960.

Xu, K.; Ding, S. P.; Jow, T. R., Toward reliable values of electrochemical stability limits for electrolytes. Journal of the Electrochemical Society 1999, 146 (11), 4172-4178.

Ishimoto, S.; Asakawa, Y.; Shinya, M.; Naoi, IC, Degradation Responses of Activated-Carbon-Based EDLCs for Higher Voltage Operation and Their Factors. Journal of the Electrochemical Society 2009, 156 (7), A563-A571.

Stevens, D. A.; Dahn, J. R., The mechanisms of lithium and sodium insertion in carbon materials. Journal of the Electrochemical Society 2001, 148 (8), A803-A811.

Aurbach, D.; Daroux, M. L.; Faguy, P. W.; Yeager, E, Identification of Surface-Films Formed on Lithium in Dimethoxyethane and Tetrahydrofuran Solutions. Journal of the Electrochemical Society 1988, /35 (8), 1863-1871.

Aurbach, D.; Granot, E., The study of electrolyte solutions based on solvents from the "glyme" family (linear polyethers) for secondary Li battery systems. Electrochimica Acta 1997, 42 (4), 697-718.

Lu, Z.; Schechter, A.; Moshkovich, M.; Aurbach, D., On the electrochemical behavior of magnesium electrodes in polar aprotic electrolyte solutions. J. Electroanal. Chem. 1999, 466 (2), 203-217.

Campbell, S. A.; Bowes, C.; McMillan, R. S., The Electrochemical-Behavior of Tetrahydrofuran and Propylene Carbonate Without Added Electrolyte. J. Electroanal. Chem. 1990, 284 (1), 195-204.

Yang, H.; Kwon, K.; Devine, T. M.; Evans, J. W., Aluminum corrosion in lithium batteries—An investigation using the electrochemical quartz crystal microbalance. Journal of the Electrochemical Society 2000, 147 {12), 4399-4407.

Zhang, S. S.; Jow, T. R., Aluminum corrosion in electrolyte of Li-ion battery. J. Power Sources 2002, 109 (2), 458-464.

Hayamizu, K; Aihara, Y.; Arai, S.; Martinez, C. G., Pulse-gradient spin-echo H-1, Li-7, and F-19 NMR diffusion and ionic conductivity measurements of 14 organic electrolytes containing LiN(S02CF3)(2). Journal of Physical Chemistry B 1999, /03 (3), 519-524.

Li, J.; Lewis, R. B.; Dahn, J. R., Sodium carboxymethyl cellulose—A potential binder for Si negative electrodes for Li-ion batteries. Electrochem. Solid State Lett. 2007, 10 (2), A17-A20.

Drofenik, J.; Gaberscek, M.; Dominko, R.; Poulsen, F. W.; Mogensen, M.; Pejovnik, S.; Jamnik, J., Cellulose as a binding material in graphitic anodes for Li ion batteries: a performance and degradation study. Electrochimica Acta 2003, 48 (7), 883-889.

Buqa, H.; Holzapfel, M.; Krumeich, F.; Veit, C.; Novak, P., Study of styrene butadiene rubber and sodium methyl cellulose as binder for negative electrodes in lithium-ion batteries. J. Power Sources 2006, 161 (1), 617-622.

Xu, J. T.; Chou, S. L.; Gu, Q. F.; Liu, H. K.; Dou, S. X., The effect of different binders on electrochemical properties of LiNi1/3Mn1/3C1/302 cathode material in lithium ion batteries. J. Power Sources 2013, 225, 172-178.

Yoshida, K.; Nakamura, M.; Kazue, Y.; Tachikawa, N.; Tsuzuki, S.; Seki, S.; Dokko, K; Watanabe, M., Oxidative-Stability Enhancement and Charge Transport Mechanism in Glyme-Lithium Salt Equimolar Complexes. Journal of the American Chemical Society 2011, /33 (33).

Lockett, V.; Horne, M.; Sedev, R.; Rodopoulos, T.; Ralston, J., Differential capacitance of the double layer at the electrode/ionic liquids interface. Physical Chemistry Chemical Physics 2010, 12 (39), 12499-12512.

Chae, J. H.; Chen, G. Z., 1.9 V aqueous carbon-carbon supercapacitors with unequal electrode capacitances. Electrochimica Acta 2012, 86, 248-254.

Peng, C.; Zhang, S. W.; Zhou, X. H.; Chen, G. Z., Unequalisation of electrode capacitances for enhanced energy capacity in asymmetrical supercapacitors. Energy Environ. Sci. 2010, 3 (10), 1499-1502.

Vaquero, S.; Palma, J.; Anderson, M.; Marcilla, R., Mass-Balancing of Electrodes as a Strategy to Widen the Operating Voltage Window of Carbon/Carbon Supercapacitors in Neutral Aqueous Electrolytes. Int. J. Electrochem. Sci. 2013, 8 (8), 10293-10307.

Weingarth, D.; Foelske-Schmitz, A.; Kotz, R., Cycle versus voltage hold—Which is the better stability test for electrochemical double layer capacitors? J. Power Sources 2013, 225, 84-88.

Conway, B. E.; Pell, W. G.; Liu, T. C., Diagnostic analyses for mechanisms of self-discharge of electrochemical capacitors and batteries. J. Power Sources 1997, 65 (1-2), 53-59.

Jow, T. R; Shacklette, L. W., A Rechargeable Cell Based on a Conductive Polymer Metal Alloy Composite Electrode. Journal of the Electrochemical Society 1989, 136 (1), 1-6.

Dudley, J. T.; Wilkinson, D. P.; Thomas, G.; Levae, R.; Woo, S.; Blom, H.; Horvath, C.; Juzkow, M. W.; Denis, B.; Juric, P.; Aghakian, P.; Dahn, J. R., Conductivity of Electrolytes for Rechargeable Lithium Batteries. J. Power Sources 1991, 35 (1), 59-82.

Ruther et al.: "Stable Electrolyte for High Voltage Electrochemical Double-Layer Capacitors" Journal of the Electrochemical Society, 164 (2) A277-A283 (2017).

\* cited by examiner

HIGH VOLTAGE WINDOW ELECTROLYTE FOR SUPERCAPACITORS

CROSS-REFERENCE TO RELATED APPLICATIONS

This application claims priority to U.S. Provisional Patent Application No. 62/419,141 filed Nov. 8, 2016, entitled "HIGH VOLTAGE WINDOW ELECTROLYTE FOR SUPERCAPACITORS", the entirety of which is incorporated herein by reference.

STATEMENT REGARDING FEDERALLY SPONSORED RESEARCH

This invention was made with government support under contract no. DE-AC05-000R22725 awarded by the US Department of Energy. The government has certain rights in this invention.

FIELD OF THE INVENTION

The present invention relates to supercapacitors, and more particularly to high voltage supercapacitors.

BACKGROUND OF THE INVENTION

Supercapacitors store ionic charge electrostatically at the interface of high surface area electrodes, such as carbon electrodes, in a liquid electrolyte composition. Supercapacitors are also referred to interchangeably as ultracapacitors or electric double-layer capacitors (EDLC). Efforts to increase the energy density of supercapacitors have focused mainly on developing higher surface area electrodes and controlling electrode pore size. Energy density of supercapacitors can also be increased through faradaic mechanisms commonly known as pseudocapacitance, which arises from the introduction of redox active groups through functionalization of the carbon electrode surface or the incorporation of metal oxides.

Despite significant improvements in electrode materials design, most non-aqueous electrochemical capacitors use the same electrolyte compositions: either a mixture of tetraethylammonium tetrafluoroborate (TEABF$_4$) in acetonitrile (AN) or TEABF$_4$ in propylene carbonate (PC). These electrolyte compositions have a high specific conductivity that minimizes resistive losses and enables capacitors to operate at high power. However, these electrolyte compositions typically exhibit a practical voltage window around only 2.5-3.0 V, beyond which the capacitor lifetime is significantly reduced. Ionic liquids and other organic solvents (adiponitrile, sulfones, and carbonates) have been considered for high voltage electrolytes for capacitors. Of these, ionic liquids have generated the most interest due to their high stability, but remain limited by high cost, low purity, and low conductivity. Since the energy stored in a capacitor increases quadratically with voltage, extending the electrochemical window of the electrolyte composition could significantly improve the energy density of the capacitor.

With prolonged cycling, the capacitance of EDLCs decreases and the resistance increases. The performance degrades more rapidly at elevated temperature or higher voltage. Degradation is typically attributed to decomposition of the electrolyte, and is very sensitive to the electrolyte composition, electrode polarity, carbon surface functionality, and trace moisture. The long-term performance of EDLCs can also be limited by the stability of other components in the cell including the carbon, polymer binders, and current collectors (typically aluminum). Commercial EDLCs with organic electrolytes operate over a voltage window between approximately 1.5 and 4.5 V vs. Na/Na$^+$. Developing higher voltage electrolytes for EDLCs requires careful consideration and control of all possible side reactions. For example, extending the positive voltage limit beyond 4.5 V vs. Na/Na$^+$ likely requires strategies to effectively suppress corrosion of the aluminum current collector. Carbon oxidation may also occur at high voltage.

Extending the negative voltage limit below 1.5 V vs. Na/Na$^+$ also presents certain challenges. The solvents most commonly used in lithium-ion batteries and EDLCs (carbonates and ACN) passivate electrodes at potentials below about 1.2 V vs. Na/Na$^+$. Effective passivation of the negative electrode is critically important for the operation of lithium-ion batteries, but detrimental for double-layer capacitors. Even very thin insulating surface films can reduce the double layer capacitance and block small pores. Binders based on polytetrafluoroethylene (PTFE), which are commonly used in commercial EDLC electrodes, are also reduced below about 1.0 V vs. Na/Na$^+$. Finally, the stability of the carbon itself with respect to reduction and/or intercalation of cations must be considered. Accordingly, there remains a continued need for an electrolyte composition that can extend the operating voltage window of a supercapacitor.

SUMMARY OF THE INVENTION

A supercapacitor includes a negative carbon-comprising electrode which does not intercalate sodium, and a positive carbon-comprising electrode. An electrolyte composition comprises sodium hexafluorophosphate and a non-aqueous solvent comprising at least one selected from the group consisting of ethylene glycol dimethyl ether, diethylene glycol dimethyl ether, triethylene glycol dimethyl ether, and tetraethylene glycol dimethyl ether. The supercapacitor has an electrochemical voltage window of from +0.0 V to 3.5 V (full cell voltage). The electrolyte has an electrochemical voltage window of from +0.05 V to 3.9 V vs. Na/Na+.

The electrolyte composition can consist essentially of sodium hexafluorophosphate and a non-aqueous solvent comprising at least one selected from the group consisting of ethylene glycol dimethyl ether, diethylene glycol dimethyl ether, triethylene glycol dimethyl ether, and tetraethylene glycol dimethyl ether. The electrolyte composition can consist of sodium hexafluorophosphate and a non-aqueous solvent comprising at least one selected from the group consisting of ethylene glycol dimethyl ether, diethylene glycol dimethyl ether, triethylene glycol dimethyl ether, and tetraethylene glycol dimethyl ether.

The positive carbon-comprising electrode and the negative carbon-comprising electrode can have a specific surface area of between 500 and 2000 m$^2$/g. The positive carbon-comprising electrode and the negative carbon-comprising electrode can comprise between 80 and 95 wt % carbon, and between 5 and 20 wt % binder.

A method of making a supercapacitor can include the steps of providing a negative carbon-comprising electrode which does not intercalate sodium on a negative electrode current collector, and providing a positive carbon-comprising electrode on a positive electrode current collector. An electrolyte composition is provided which comprises sodium hexafluorophosphate and a non-aqueous solvent comprising at least one selected from the group consisting of ethylene glycol dimethyl ether, diethylene glycol dimethyl ether, triethylene glycol dimethyl ether, and tetraethylene glycol dimethyl ether. The electrolyte is positioned between the positive electrode and the negative electrode. The electrolyte has an electrochemical voltage window of from +0.05 V to 3.9 V vs. Na/Na$^+$. The supercapacitor has an electrochemical voltage window of from +0.0 V to 3.5 V (full cell voltage).

An electrolyte for a supercapacitor comprises sodium hexafluorophosphate and a non-aqueous solvent comprising at least one selected from the group consisting of ethylene glycol dimethyl ether, diethylene glycol dimethyl ether, triethylene glycol dimethyl ether, and tetraethylene glycol dimethyl ether. The electrolyte has an electrochemical voltage window of from +0.05 V to 3.9 V vs. Na/Na+. The electrolyte can consist essentially of sodium hexafluorophosphate and a non-aqueous solvent comprising at least one selected from the group consisting of ethylene glycol dimethyl ether, diethylene glycol dimethyl ether, triethylene glycol dimethyl ether, and tetraethylene glycol dimethyl ether. The electrolyte can consist of sodium hexafluorophosphate and a non-aqueous solvent comprising at least one selected from the group consisting of ethylene glycol dimethyl ether, diethylene glycol dimethyl ether, triethylene glycol dimethyl ether, and tetraethylene glycol dimethyl ether.

A method of operating a supercapacitor can include the steps of providing a negative carbon-comprising electrode which does not intercalate sodium on a negative electrode current collector, and providing a positive carbon-comprising electrode on a positive electrode current collector. An electrolyte composition is provided which comprises sodium hexafluorophosphate and a non-aqueous solvent comprising at least one selected from the group consisting of ethylene glycol dimethyl ether, diethylene glycol dimethyl ether, triethylene glycol dimethyl ether, and tetraethylene glycol dimethyl ether. The electrolyte is positioned between the positive electrode and the negative electrode to form a supercapacitor. The supercapacitor is operated within an electrochemical voltage window of from +0 V to 3.5 V (full cell voltage).

These and other features and advantages of the present invention will become apparent from the following description of the invention, when viewed in accordance with the accompanying drawings and appended claims.

BRIEF DESCRIPTION OF THE DRAWINGS

There are shown in the drawings embodiments that are presently preferred it being understood that the invention is not limited to the arrangements and instrumentalities shown, wherein.

DETAILED DESCRIPTION OF THE INVENTION

Figure 1:
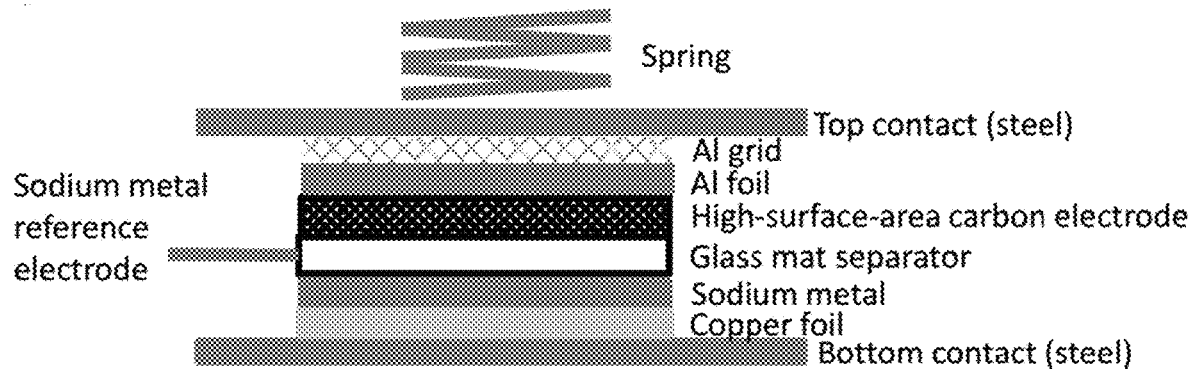
FIG. 1 is a schematic cross-sectional illustration of a three-electrode cell which is used to evaluate separately the individual electrodes of a supercapacitor.

The invention is directed to high voltage electrolytes for supercapacitors. A supercapacitor and an electrolyte composition for use in a supercapacitor are described herein. The supercapacitor includes a negative carbon electrode having a current collector, a positive carbon electrode having a current collector, an ion-permeable separator disposed between the negative and positive electrodes, and an electrolyte composition disposed between the negative and positive electrodes. A new combination of solvent and salt compositions is stable up to 3.9 V electrochemical window. The electrolyte composition includes a conductive sodium salt component including sodium hexafluorophosphate ($NaPF_6$) and a non-aqueous solvent component including dimethoxyethane (DME).

High voltage electrolytes are common to the lithium battery and lithium-ion battery industries. These electrolytes typically consist of a lithium salt (or mixture of lithium salts) dissolved in a solvent or mixture of solvents. The solvents for these high voltage applications are typically selected from the list: Acetonitrile (AN), γ-Butyrolactone (BL), 1,2-Dimethoxyethane (DME,monoglymo), 1.2-Diethoxyethane (DEE, diglyme), Triglyme, Tetraglyme, Diethyl Carbonate (DEC), Dimethyl Carbonate (DMC), Dimethylformamide (DMF), Dimethylsulfite (DMS), Dimethylsulfoxide (DMSO), Dioxolane (DL), Ethylene Carbonate (EC), Ethylene Glycol Sulfite (EGS), Ethyl Propyl Carbonate (EPC), Methyl Acetate (MA), Methyl Formate (MF), Methyl Ethyl Carbonate (MEC), 3-Methyl-2-Oxazolidinone (3-Me-2OX), N-Methyl Pyrrilidinone (NMP), Methyl Propyl Carbonate (MPC), 2-Methyltetrahydrofuran (2-MeTHF), Nitromethane (NM), Propylene Carbonate (PC), Tetrahydrofuran (THF), Thionyl Chloride ($SOCl_2$, also a cathode material), Sulfolane (SL), Sulfuryl Chloride ($SO_2Cl_2$, also a cathode material), Sulfur Dioxide ($SO_2$, also a cathode material).

The salt (or salt mixture) for high voltage battery electrolytes is typically selected from the list: Lithium Bromide (LiBr), Lithium Perchlorate ($LiClO_4$), Lithium Tetrafluoroborate ($LiBF_4$), Lithium Tetrachloroaluminate ($LiAlCl_4$), Lithium Hexafluorophosphate ($LiPF_6$), Lithium Hexafluoroarsenate ($LiAsF_6$), Lithium Trifluoromethanesulfonate (LiTFS, $LiCF_3SO_3$), Lithium Perfluoromethylsulfonyl Imide (LiTFSI, $LiN(CF_3SO_2)_2$), Lithium Perfluoromethylsulfonyl Methide ($LiC((CF_3SO_2)_3)$, Lithium Bis(oxalato)borate (LiBOB, $LiC_4BO_8$).

These battery electrolytes are not used in supercapacitors because (at negative potentials) most of these solvents are reduced to yield insoluble compounds which passivate the electrode surface. These passive films are essential for the safe operation of lithium and lithium-ion batteries, but they reduce the capacitance at carbon electrodes (often by several orders of magnitude) and are therefore not useful in supercapacitors which rely on high capacitance at the carbon electrode surface. Furthermore, lithium ions and solvent-coordinated lithium ions intercalate into many carbon electrode materials (lithium intercalation is the preferred reaction for lithium-ion batteries) and this can lead to exfoliation of the carbon and destruction of the electrode. Therefore, for supercapacitors, the lithium salt is replaced with an organic cation salt typically selected from the list: Tetraethylammonium Hexafluorophosphate ($Et_4NPF_6$), Tetraethylammonium Tetrafluoroborate ($Et_4NBF_4$), Tetraethylammonium Trifluoromethanesulfonate ($Et_4NCF_3SO_3$), Tetraethylammonium Perfluoromethylsulfonyl Imide ($Et_4N(CF_3SO_2)_2N$), Tetraethylammouinm Perchlorate ($Et_4NClO_4$), Tetrabutylammonium Perchlorate ($Bu_4NClO_4$), Trimethylethylammonium Hexafluorophosphate ($Me_3EtNPF_6$), Tripropylmethylammonium Hexapfuorophosphate ($Pr_3MeNPF_6$), Triisopropylmethylammonium Hexafluorophosphate ($iPr_3MeNPF_6$), Diisopropylethylmethylammonium Hexafluorophosphate ($iPr_2EtMeNPF_6$), Tributylmethylammonium Hexafluorophosphate ($Bu_3MeNPF_6$), Triisobutylmethylarnmonium Hexafluorophosphate ($iBu_3MeNPF_6$), Triethylmethylphosphonium Hexafluorophosphate ($Et_3MePPF_6$), Tributylmethylphosphonium Hexafluorophosphate ($Bu_3MePPF_6$).

Virtually all commercial nonaqueous supercapacitors utilize either $Et_4NBF_4$ in acetonitrile or $Et_4NBF_4$ in propylene carbonate. Acetonitrile and propylene carbonate are each oxidatively stable to >4.0 V vs $Li/Li^+$. Both solvents, however are reductively unstable and this leads to a working voltage range of ~2.7 V for supercapacitors with these electrolytes.

Glyme solvents and in particular DME are oxidatively stable to >3.9 V vs $Na/Na^+$, and they are reductively stable to <0.05 vs $Na/Na^+$. This voltage stability range enables a possible working voltage window of approximately 3.9 V for supercapacitors. However, organic cation salts exhibit relatively low solubility in glyme solvents. Nevertheless, monovalent alkali cation salts exhibit much higher solubility because the cations coordinate with the ether oxygen linkages on the glyme molecules. Specifically, DME has a high donor number (20) and it strongly coordinates with alkali cations. $Li^+$ and $K^+$ cations readily intercalate into carbon electrodes at negative potentials, thereby limiting the use of lithium and potassium salts for supercapacitors. However, $Na^+$ cations exhibit anomalous intercalation behavior into carbon which depends very much on the crystallographic structure of the carbon and on the solvent. Some solvents co-intercalate into some carbons with the $Na^+$ cations to yield C—Na-solvent ternary compounds. In particular, $Na^+$ salts in THF, 2MeTHF and diglyme solvents exhibit this behavior.

Other side reactions may also limit the working range of the supercapacitor. In addition to strong alkali cation coordination, the glyme solvents also strongly coordinate to other cations such as $Al^{+3}$. These solvents dramatically accelerate the corrosion of aluminum current collectors. Conventional supercapacitor electrodes utilize Polytetrafluoroethylene (PTFE) as a binder in the formation of the electrodes from carbon powders. PTFE, however, is reduced at potentials approximately <0.7 V vs $Na/Na^+$. Therefore, PTFE-bonded carbon electrodes will exhibit a working voltage range approximately 0.65 V lower than the voltage window of the DME solvent. In order to enable the utilization of the 3.9 V working voltage range of the electrolyte of the current invention, it is necessary to identify the precise sodium salt and the precise carbon structure that does not permit intercalation of Na$^+$ or the cointercalation of the solvent to yield ternary intercalation compounds. And, a new binder for the carbon electrode must be identified and the aluminum corrosion reaction must be eliminated.

The NaPF$_6$ salt minimizes corrosion of the aluminum current collectors. DME has a low viscosity, which promotes high electrolyte conductivity. Glymes with higher molecular weight also can be capable of providing a similar voltage window. Sodium carboxymethyl cellulose can be used as an electrode binder primarily for its excellent stability over a wide voltage window. This binder also has the advantage of being water-soluble and environmentally benign. The DME-based electrolyte shows an electrochemical window up to 3.5 V in full cells with high-surface-area carbon electrodes. The high voltage performance could significantly increase the overall energy density of EDLCs.

The invention represents an unexpected discovery that combination of NaPF$_6$ in DME does not intercalate (or co-intercalate solvent) or form ternary intercalation compounds in BP2000 carbon. Furthermore, the PF$_6^-$ anion inhibits aluminum corrosion, and the use of sodium carboxymethyl cellulose as the binder for the BP2000 carbon electrode (in place of PTFE) enables the utilization of the approximately 3.9V window of the electrolyte of the current invention in supercapacitor whose electrodes are comprised of sodium carboxymethyl cellulose bonded BP2000 carbon.

An electrolyte consisting of NaPF$_6$ salt in 1,2-dimethoxyethane (DME) can extend the voltage window of electric double-layer capacitors (EDLCs) to >3.5 V. DME does not passivate carbon electrodes at very negative potentials (near Na/Na+), extending the practical voltage window by about 1.0 V compared to standard, non-aqueous electrolytes based on acetonitrile. The voltage window is demonstrated in two- and three-electrode cells using a combination of electrochemical impedance spectroscopy (EIS), charge-discharge cycling, and measurements of leakage current. DME-based electrolytes cannot match the high conductivity of acetonitrile solutions, but they can satisfy applications that demand high energy density at moderate power. The conductivity of NaPF$_6$ in DME is comparable to commercial lithium-ion battery electrolytes and superior to most ionic liquids.

A supercapacitor according to the present invention includes a negative carbon-comprising electrode which does not intercalate sodium, and a positive carbon-comprising electrode. An electrolyte composition comprises sodium hexafluorophosphate and a non-aqueous solvent comprising at least one selected from the group consisting of ethylene glycol dimethyl ether, diethylene glycol dimethyl ether, triethylene glycol dimethyl ether, and tetraethylene glycol dimethyl ether. The electrolyte has an electrochemical voltage window of from +0.05 V to 3.9 V vs. Na/Na$^+$. The upper limit of the voltage window can be 3.5 V, 3.6 V, 3.7 V, 3.8 V, and 3.9 V vs. Na/Na$^+$, or within a range of any high and low value selected from these.

The electrolyte composition can consist essentially of sodium hexafluorophosphate and a non-aqueous solvent comprising at least one selected from the group consisting of ethylene glycol dimethyl ether, diethylene glycol dimethyl ether, triethylene glycol dimethyl ether, and tetraethylene glycol dimethyl ether. The electrolyte composition can consist of sodium hexafluorophosphate and a non-aqueous solvent comprising at least one selected from the group consisting of ethylene glycol dimethyl ether, diethylene glycol dimethyl ether, triethylene glycol dimethyl ether, and tetraethylene glycol dimethyl ether.

The positive carbon-comprising electrode and the negative carbon-comprising electrode can have a specific surface area of between 500 and 2000 m$^2$/g. The positive carbon-comprising electrode and the negative carbon-comprising electrode can comprise between 80 and 95 wt % carbon, and between 5 and 20 wt % binder.

A method of making a supercapacitor according to the invention includes the steps of providing a negative carbon-comprising electrode which does not intercalate sodium on a negative electrode current collector, and providing a positive carbon-comprising electrode on a positive electrode current collector. An electrolyte composition is provided which comprises sodium hexafluorophosphate and a non-aqueous solvent comprising at least one selected from the group consisting of ethylene glycol dimethyl ether, diethylene glycol dimethyl ether, triethylene glycol dimethyl ether, and tetraethylene glycol dimethyl ether. The electrolyte is positioned between the positive electrode and the negative electrode. The electrolyte has an electrochemical voltage window of from +0.05 V to 3.9 V vs. Na/Na$^+$.

A method of operating a supercapacitor according to the invention includes the steps of providing a negative carbon-comprising electrode which does not intercalate sodium on a negative electrode current collector, and providing a positive carbon-comprising electrode on a positive electrode current collector. An electrolyte composition is provided which comprises sodium hexafluorophosphate and a non-aqueous solvent comprising at least one selected from the group consisting of ethylene glycol dimethyl ether, diethylene glycol dimethyl ether, triethylene glycol dimethyl ether, and tetraethylene glycol dimethyl ether. The electrolyte is positioned between the positive electrode and the negative electrode. The supercapacitor is operated within an electrochemical voltage window of from +0.0 V to >3.5 V (full cell voltage).

An electrolyte for a supercapacitor according to the invention includes sodium hexafluorophosphate and a non-aqueous solvent comprising at least one selected from the group consisting of ethylene glycol dimethyl ether, diethylene glycol dimethyl ether, triethylene glycol dimethyl ether, and tetraethylene glycol dimethyl ether. The electrolyte has an electrochemical voltage window of from +0.05 V to 3.9 V vs. Na/Na$^+$.

In one embodiment, a method of forming a supercapacitor includes providing a negative electrode consisting of sodium carboxymethyl cellulose bonded carbon Black Pearls 2000 (BP2000, Cabot Corporation) and having an aluminum current collector; and providing a positive electrode consisting of carbon BP2000 or other high surface area carbon and having a current collector; providing an ion-permeable separator in a space between the negative and positive electrodes, and providing an electrolyte composition in the space between the negative and positive electrodes. The electrolyte composition includes a conductive sodium salt component including sodium hexafluorophosphate (NaPF$_6$) and a non-aqueous solvent component including dimethoxyethane (DME).

In another embodiment, the electrolyte composition may further contain additional salts such as: sodium trifluoromethanesulfonate (NaTFS), sodium perchlorate (NaClO$_4$), tetrabutylammonium perchlorate (TBAClO$_4$), tetrabutylammonium hexafluorophosphate (TBAPF$_6$), or combinations thereof. The electrolyte composition may also further contain additional solvents such as: diglyme, triglyme, tetraglyme, tetrahydrofuran, 2-methyltetrahydrofuran, or combinations thereof.

Experimental Procedure

Electrolyte Preparation

All procedures were carried out in a glove box filled with high-purity argon. Sodium hexafluorophosphate (NaPF$_6$, 98% Sigma Aldrich) was dissolved in 1,2-dimethoxyethane (DME, battery grade, Mitsubishi Chemical Company) at a concentration of 1 molal (m). Some control experiments were performed with a standard acetonitrile-based electrolyte. Tetraethylammonium tetrafluoroborate (TEABF$_4$, electrochemical grade, Sigma Aldrich) was dissolved in acetonitrile (ACN, 99.8%, anhydrous, Sigma Aldrich) at 1 m concentration. Both electrolytes were dried over 4 A molecular sieve for several days. After drying, the DME-based electrolyte was stored over sodium metal to remove other impurities.

Electrode Preparation:

High-surface-area carbon electrodes were prepared using 85 wt. % Black Pearls 2000 (BP2000, Cabot Corporation, BET surface area 1500 m$^2$/g) and 15 wt. % sodium carboxymethyl cellulose (CMC, Sigma Aldrich, molecular weight 700,000). BP2000 and CMC were ultrasonicated in water to produce a homogenous suspension. Electrodes were deposited by spray-coating onto aluminum foil. Electrode thickness ranged from 25 to 130 μm with loadings from 0.4 to 2.2 mg/cm$^2$.

Electrochemical Testing:

Two-electrode button cells (316L stainless steel, size CR2032, Hohsen. Corp. Japan) were prepared using high-surface-area carbon electrodes and a polymer separator (Celgard 2325). Some measurements were performed using a three-electrode cell (EL-Cell GmbH) with sodium metal for the reference and counter electrodes, using the configuration shown in FIG. 1. The two-electrode button cell configuration is shown in FIG. 2. Potentials measured with the three-electrode cell are referenced to the Na/Na+ potential ($E_{Na/Na+} \approx +0.13$ V vs. $E_{Li/Li+}$). One polymer separator and one glass fiber separator were used in the three-electrode cells to provide sufficient electrode separation to accommodate the reference electrode. Unless stated otherwise, 1 m NaPF$_6$ in DME was used as the electrolyte. Cyclic voltammetry (CV), electrochemical impedance spectroscopy (EIS), charge-discharge cycling, float tests, and leakage current measurements were acquired using Bio-Logic instruments (VSP and MPG2). All tests were conducted at room temperature.

Figure 2:
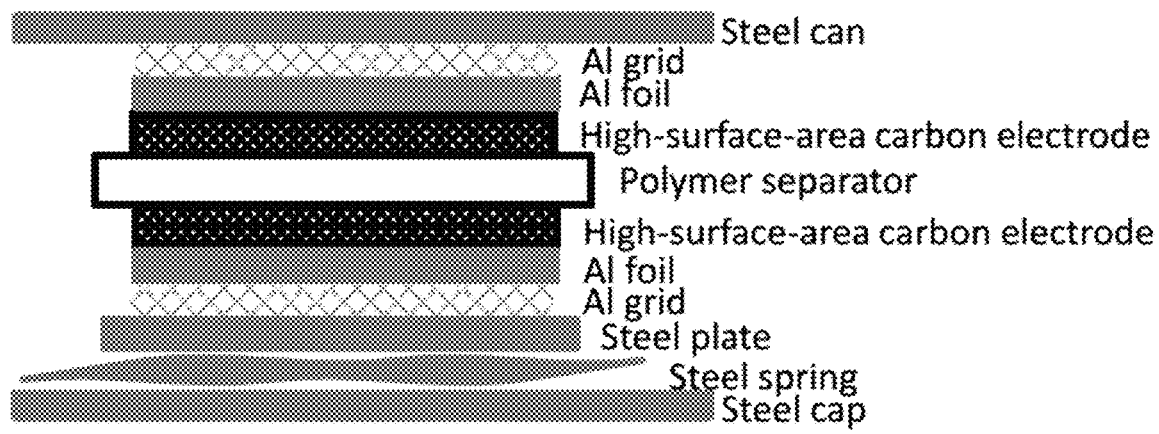
FIG. 2 is a schematic cross-sectional illustration of a supercapacitor fabricated as a button cell stack.
Figure 3:
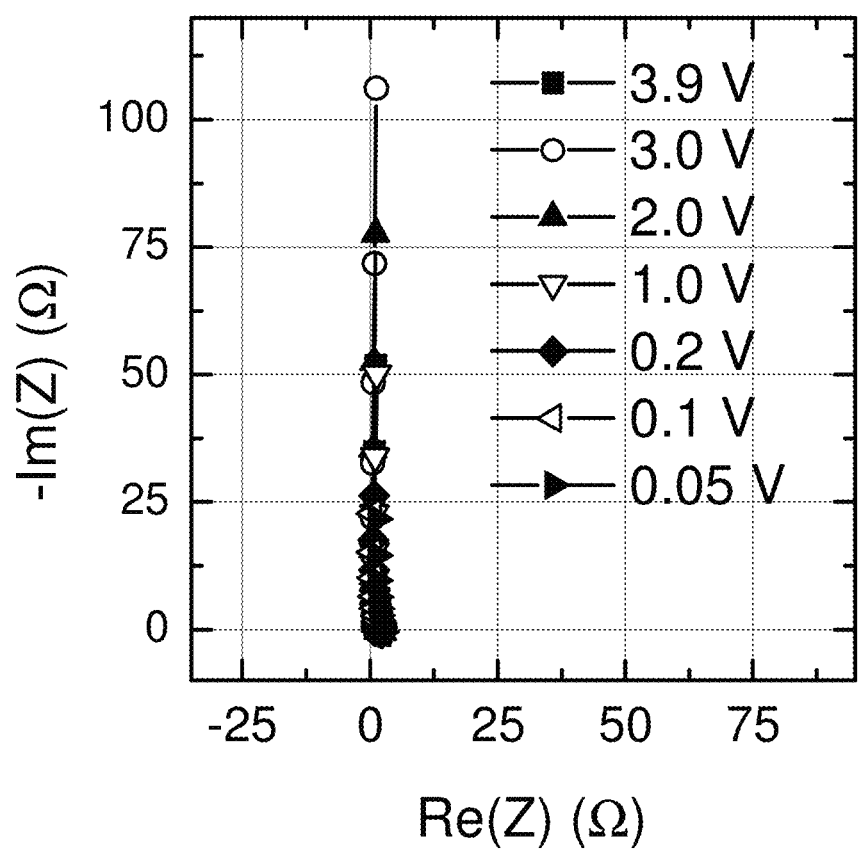
FIG. 3 shows the complex impedance (−Im(Z)(Ω) vs. Re(Z)(Ω)) of a single carbon BP2000 electrode with the electrolyte of the invention (1.0 m NaPF$_6$ in DME). The measurements were made in the three-electrode configuration of FIG. 1.

FIG. 3 shows EIS (20 kHz-10 mHz) of the carbon electrode in 1 m NaPF$_6$/DME electrolyte at different voltages measured in the three-electrode cell of FIG. 1 with sodium counter and reference electrodes. The carbon electrode was held at each voltage step for 2 h prior to measurement, and EIS was taken between 0.05 and 3.9 V vs. Na/Na+.

FIG. 3 shows the complex impedance of a single carbon BP2000 electrode in the electrolyte of the current invention (1.0 m NaPF6 in DME). The measurements were made in the three-electrode configuration of FIG. 1. The negative voltage limit extends almost to the sodium potential. FIG. 3 shows EIS spectra collected between 0.05 and 3.9 V vs. Na/Na$^+$. The low-frequency EIS data form vertical lines over this entire voltage range, indicating that no side-reactions occur within this window. Importantly, the electrode is not passivated even within 50 mV of the sodium potential.

Figure 4:
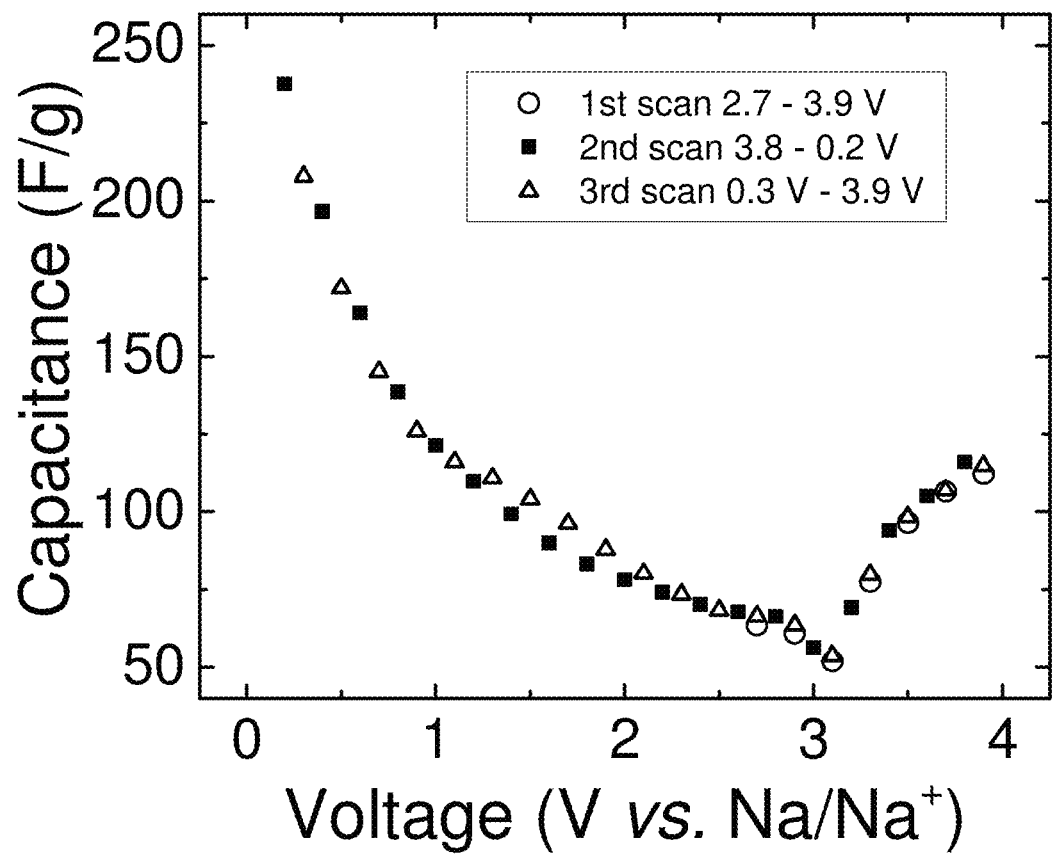
FIG. 4 is a plot of capacitance (F/g) vs. voltage (V vs. Na/Na$^+$) of the carbon BP2000 electrode in the electrolyte of the invention (1.0 m NaPF$_6$ in DME). The capacitance values were derived from complex impedance measurements using the three-electrode cell configuration of FIG. 1. Example impedance curves are shown in FIG. 3.

FIG. 4 shows the capacitance of the carbon BP2000 electrode in the electrolyte of the Current invention. The capacitance values were derived from complex impedance measurements using the three-electrode cell configuration of FIG. 1. Example impedance curves are shown in FIG. 3.

FIG. 4 shows the electrode capacitance taken from the EIS data. A minimum in the capacitance occurs near 3.0 V vs. Na/Na+, which also corresponds to the open circuit potential. This minimum reflects the potential of zero charge of the carbon electrode. Moving away from the potential of zero charge, the capacitance steadily increases, confirming the electrodes do not passivate over this voltage range. The capacitance values measured by EIS range from 50 to 250 F/g, which is comparable to what is obtained with high surface area electrodes in ACN-based electrolyte with three-electrode cells.

Figure 5:
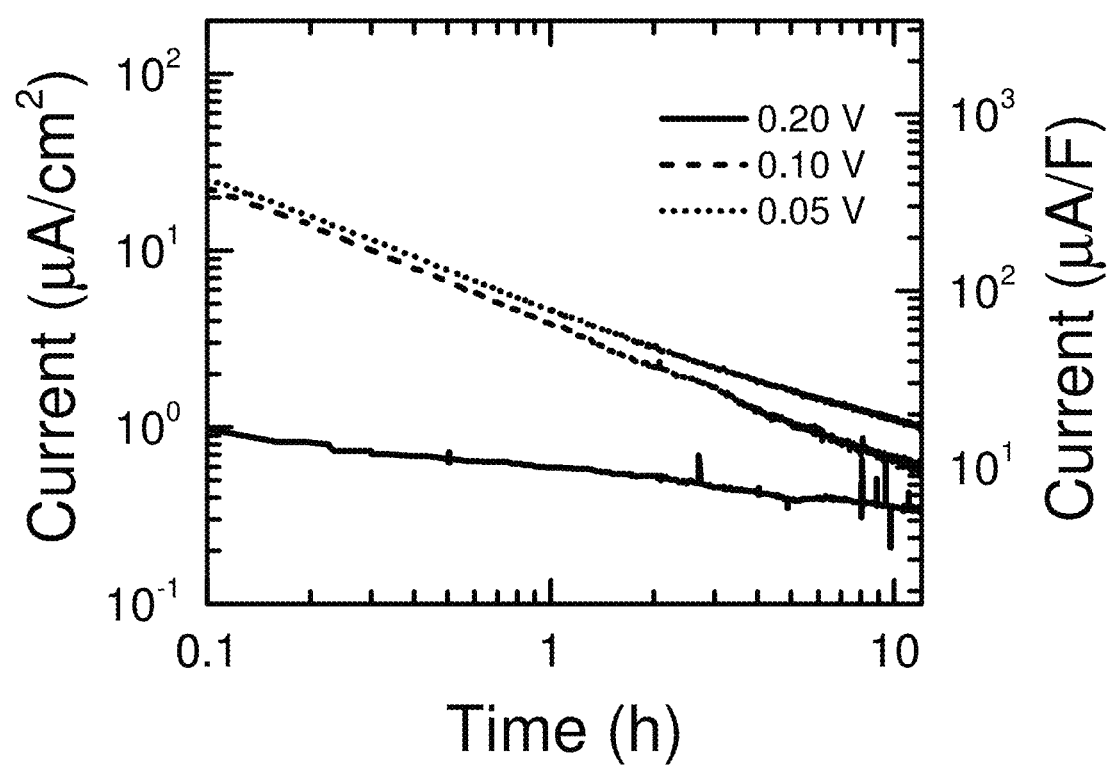
FIG. 5 shows the leakage current (μA/cm$^2$) vs. time (h) at the carbon BP2000 electrode when it is used as an anode (negative electrode) of a supercapacitor. The measurements were made in the three-electrode configuration of FIG. 1.
Figure 6:
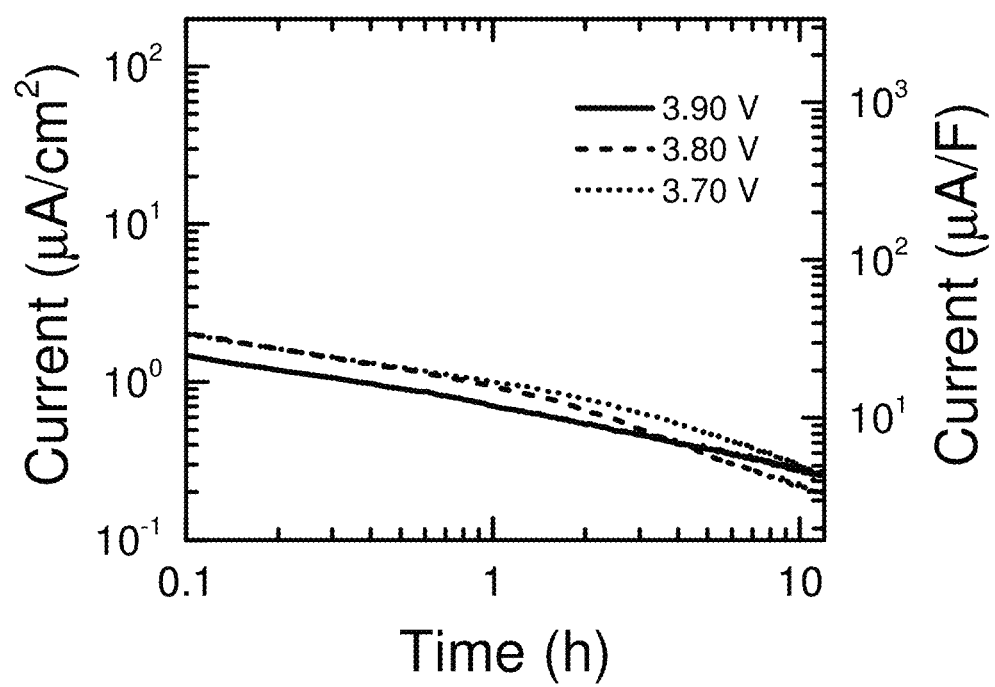
FIG. 6 is a plot of the leakage current (μA/cm$^2$) vs. time (h) at the carbon BP2000 electrode when it is used as a cathode (positive electrode) of a supercapacitor. The measurements were made in the three-electrode configuration of FIG. 1.

To verify that no side-reactions occur between 0.05 and 3.9 V vs. Na/Na$^+$ leakage currents were also measured in the three-electrode cells. FIG. 5 shows the leakage current at the carbon BP2000 electrode when it is used as an anode (negative electrode) of a supercapacitor. The measurements were made in the three-electrode configuration of FIG. 1. FIG. 6 shows the leakage current at the carbon BP2000 electrode when it is used as a cathode (positive electrode) of a supercapacitor. The measurements were made in the three-electrode configuration of FIG. 1.

The carbon electrode was held at different potentials for 12 h while the decay in the current was monitored. FIG. 5 shows that the leakage currents are <2 μA/cm$^2$ at the low limit of the voltage window. FIG. 6 shows that the leakage currents are <1 μA/cm$^2$ at the high limit of the voltage window. Impedance spectra were collected before and after the leakage current measurements to verify that the low currents were not due to electrode passivation (data not shown). Together, the data obtained from the three-electrode cells indicate that the NaPF$_6$/DME electrolyte has a voltage window from 0.05-3.9 V vs. Na/Na$^+$.

Figure 7:
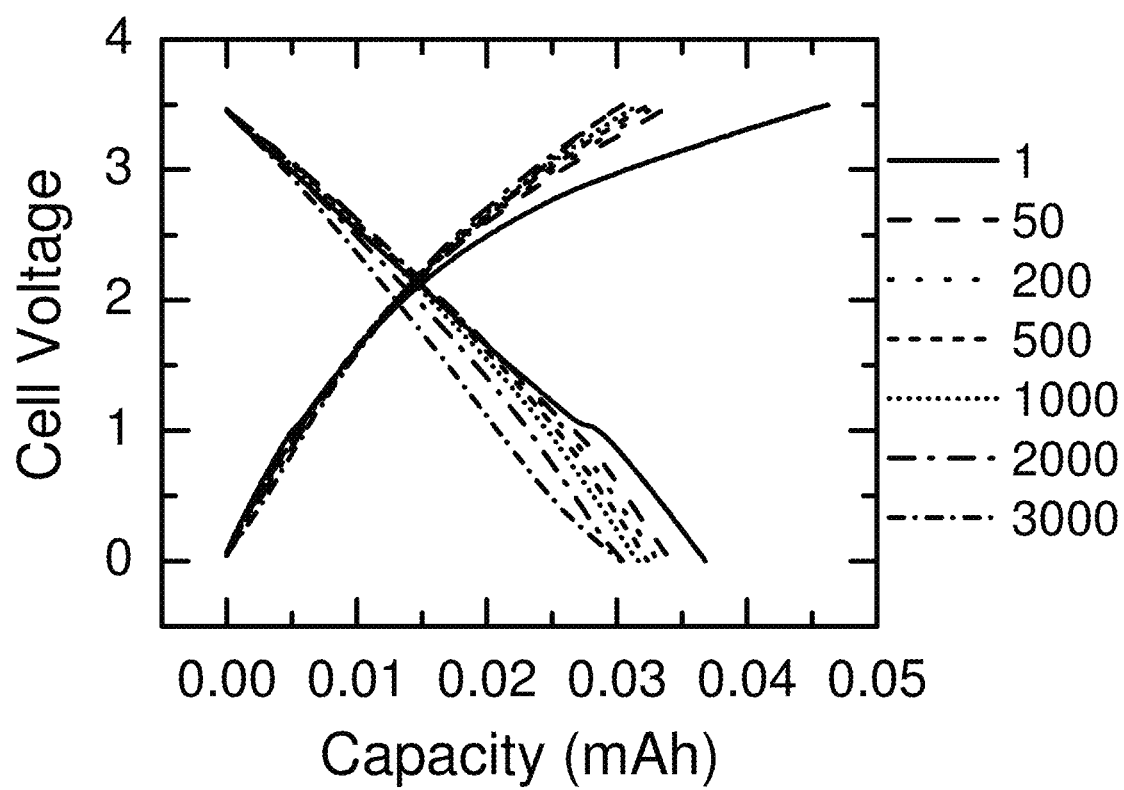
FIG. 7 shows the charge and discharge curves (cell voltage vs. capacity (mAh)) for a supercapacitor consisting of a carbon BP2000 anode and carbon BP2000 cathode in the electrolyte of the invention (1.0 m NaPF$_6$ in DME). Representative charge-discharge cycles are shown (cycles 1, 50, 200, 500, 1000, 2000, and 3000). The measurements were made in the two-electrode configuration of FIG. 2.

FIG. 7 shows the charge and discharge curves for a supercapacitor consisting of a carbon BP2000 anode and carbon BP2000 cathode in the electrolyte of the current invention (1.0 m NaPF$_6$ in DME). Representative charge-discharge cycles are shown. The measurements were made in the two-electrode configuration of FIG. 2.

Figure 8:
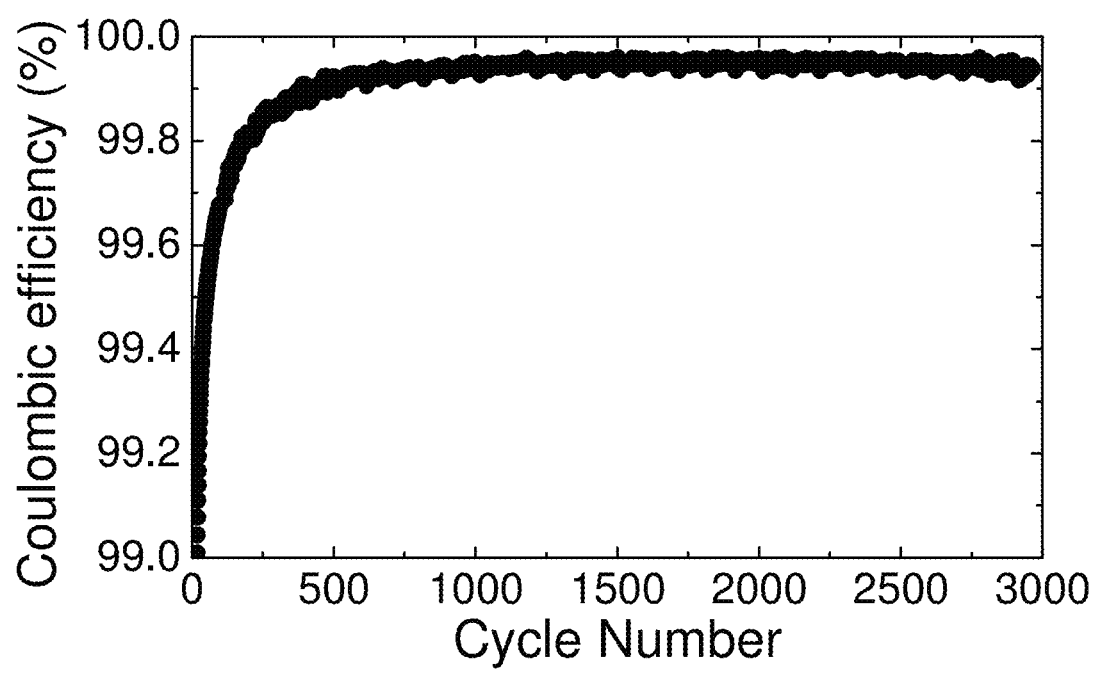
FIG. 8 shows the coulombic efficiency (%) vs. cycle number for the supercapacitor of FIG. 7, over 3000 charge-discharge cycles. The measurements were made in the two-electrode configuration of FIG. 2.

FIG. 8 shows the coulombic efficiency of the supercapacitor of FIG. 7 over 3000 charge-discharge cycles. The measurements were made in the two-electrode configuration of FIG. 2.

Figure 9:
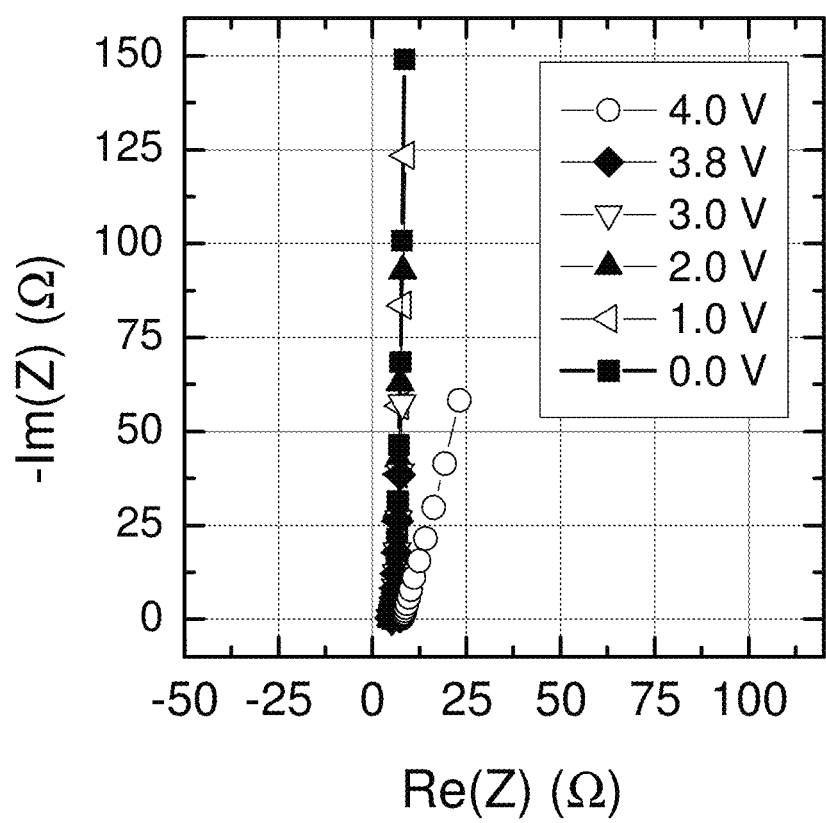
FIG. 9 shows the complex impedance (−Im(Z)(Ω) vs. Re(Z)(Ω)) of a supercapacitor consisting of a carbon BP2000 anode and carbon BP2000 cathode in the electrolyte of the invention (1.0 m NaPF$_6$ in DME). The measurements were made in the two-electrode configuration of FIG. 2.

FIG. 9 shows the complex impedance of a supercapacitor consisting of a carbon BP2000 anode and carbon BP2000 cathode in the electrolyte of the current invention (1.0 m NaPF6 in DME). The measurements were made in the two-electrode configuration of FIG. 2.

The voltage window for the full cells was checked by EIS. FIG. 9 shows the EIS response of a full cell charged to different voltages. Up to 3.8 V the EIS spectra are vertical lines, indicating the cell behaves as an ideal capacitor with no measurable side-reactions. At 4.0 V the EIS spectrum is no longer vertical, demonstrating that the voltage window has been exceeded.

Figure 10:
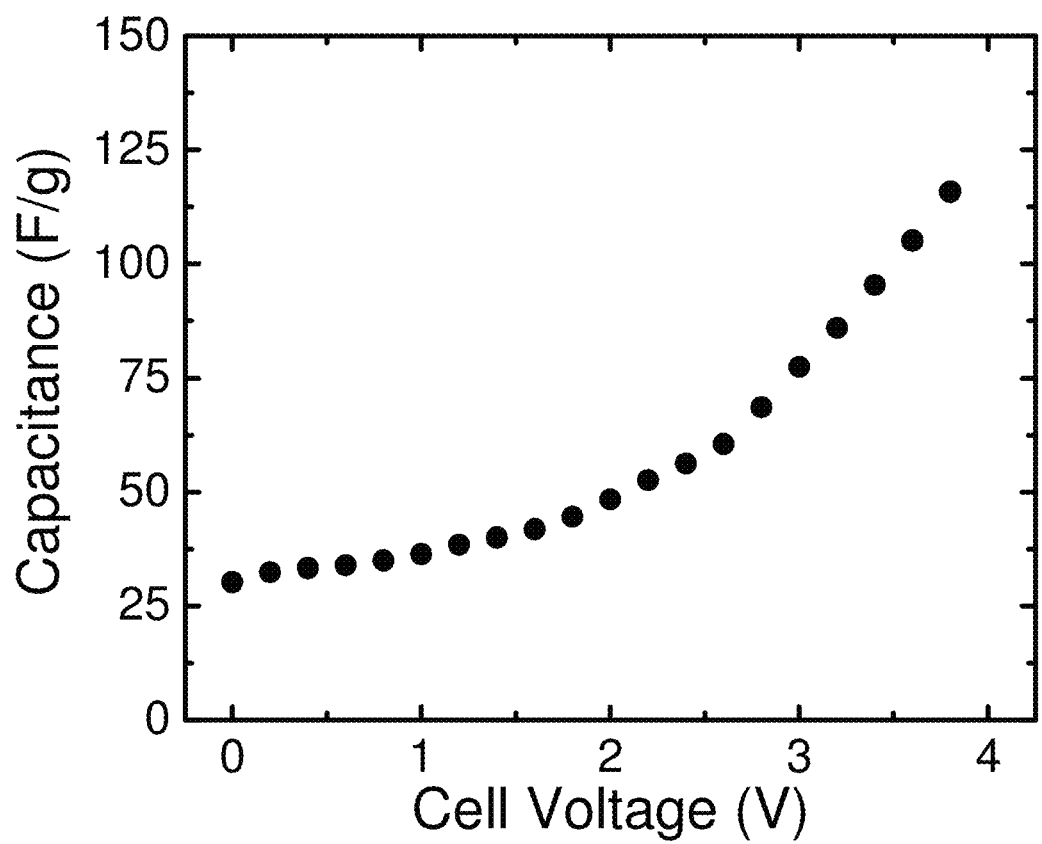
FIG. 10 is a plot of capacitance (F/g) vs. voltage for a supercapacitor consisting of a carbon BP2000 anode and carbon BP2000 cathode in the electrolyte of the invention (1.0 m NaPF$_6$ in DME). The capacitance values were derived from complex impedance measurements using the two-electrode cell configuration of FIG. 2. Example impedance curves are shown in FIG. 9.

FIG. 10 shows the capacitance of a supercapacitor consisting of a carbon BP2000 anode and carbon BP2000 cathode in the electrolyte of the current invention (1.0 m NaPF6 in DME). The capacitance values were derived from complex impedance measurements using the two-electrode cell configuration of FIG. 2. Example impedance curves are shown in FIG. 9. The capacitance of the full cell with the DME-based electrolyte is comparable to what can typically be achieved with ACN-based electrolytes in similar two-electrode cells.

Figure 11:
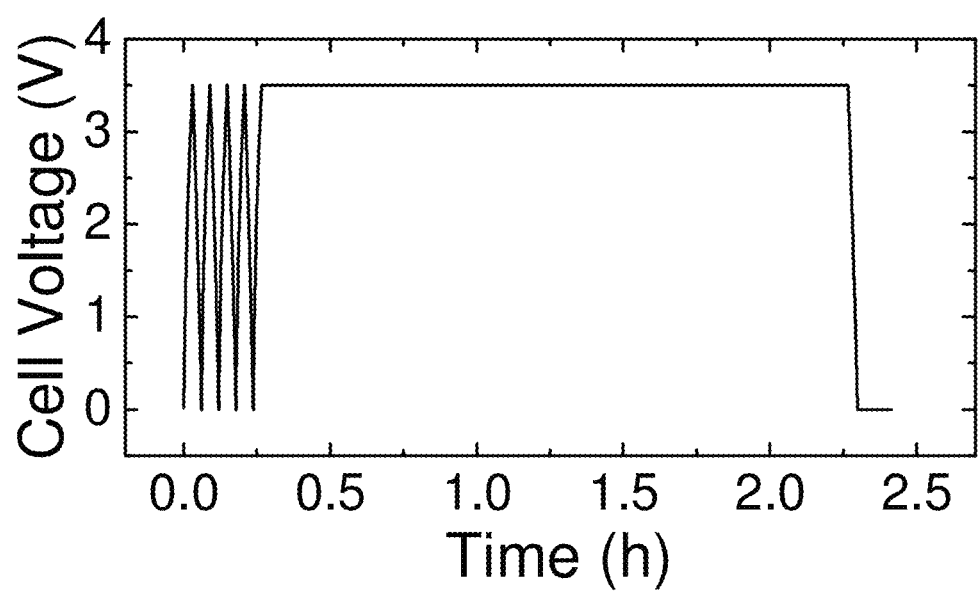
FIG. 11 is a schematic diagram of one duty cycle of the protocol used to generate the data shown in FIGS. 12, 13, and 14. Supercapacitors were tested in the two-electrode configuration of FIG. 2. The maximum cell voltage was chosen to be either 3.0 (FIG. 13) or 3.5 V (FIGS. 12 and 14).
Figure 12:
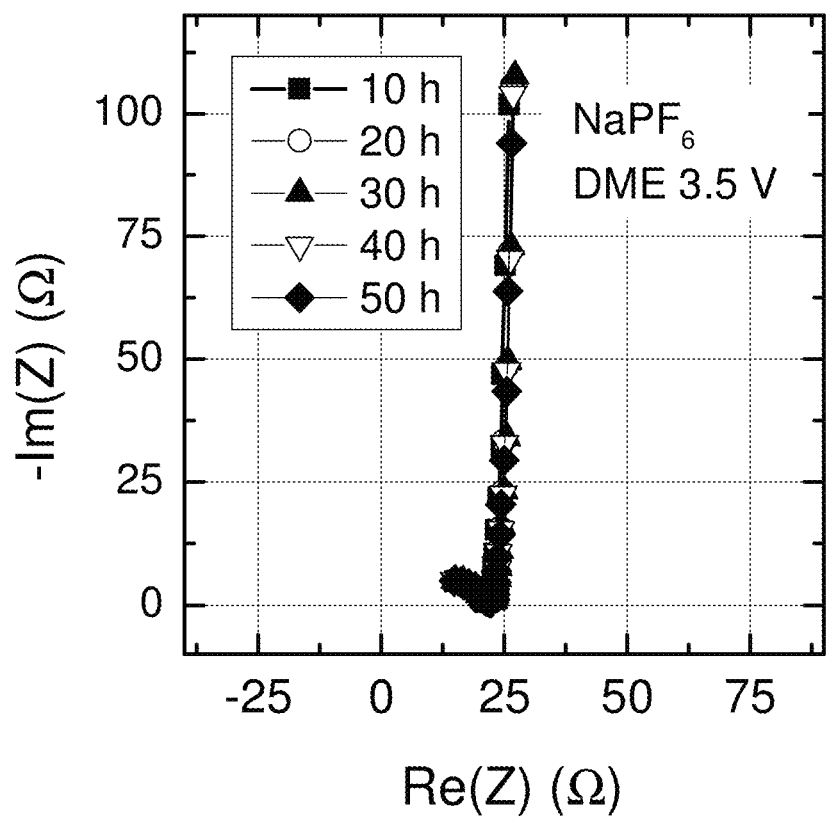
FIG. 12 shows the complex impedance (−Im(Z)(Ω) vs. Re(Z)(Ω)) of a supercapacitor consisting of a carbon BP2000 anode and carbon BP2000 cathode in the electrolyte of the invention (1.0 m NaPF6 in DME). The measurements were made in the two-electrode configuration of FIG. 2. The supercapacitor was cycled using the duty cycle shown in FIG. 11. The maximum cell voltage reached 3.5 V. The time durations in the figure legend represent the cumulative time at 3.5 V before each impedance measurement.
Figure 13:
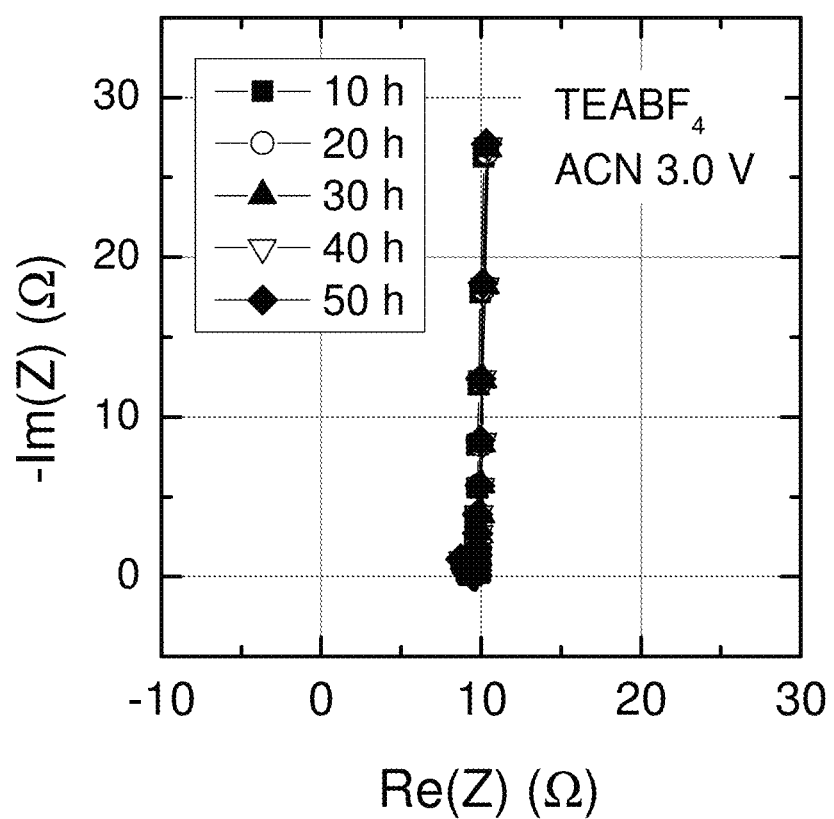
FIG. 13 shows the complex impedance (−Im(Z)(Ω) vs. Re(Z)(Ω)) of a supercapacitor consisting of a carbon BP2000 anode and carbon BP2000 cathode in a conventional electrolyte (1.0 m tetraethylammonium tetrafluoroborate in acetonitrile). The measurements were made in the two-electrode configuration of FIG. 2. The supercapacitor was cycled using the duty cycle shown in FIG. 11. The maximum cell voltage reached 3.0 V. The time durations in the figure legend represent the cumulative time at 3.0 V before each impedance measurement.
Figure 14:
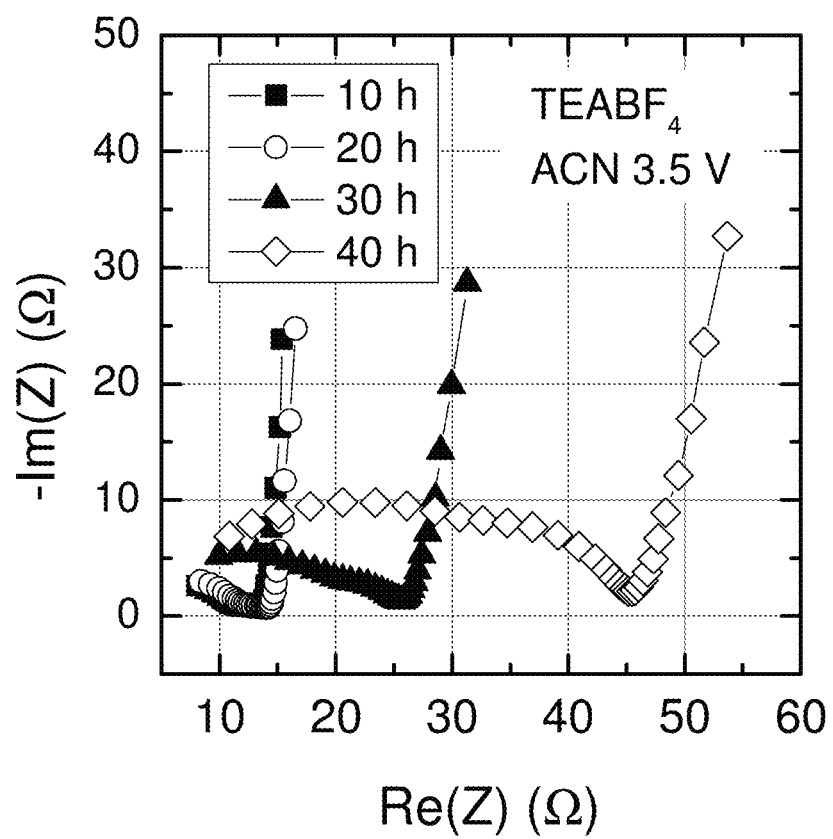
FIG. 14 shows the complex impedance(−Im(Z)(Ω) vs. Re(Z)(Ω)) of a supercapacitor consisting of a carbon BP2000 anode and carbon BP2000 cathode in a conventional electrolyte (1.0 m tetraethylammonium tetrafluoroborate in acetonitrile). The measurements were made in the two-electrode configuration of FIG. 2. The supercapacitor was cycled using the duty cycle shown in FIG. 11. The maximum cell voltage reached 3.5 V. The time durations in the figure legend represent the cumulative time at 3.5 V before each impedance measurement.

FIG. 11 shows the schematic of one duty cycle of the protocol used to generate the data shown in FIGS. 12, 13, and 14. Supercapacitors were tested in the two-electrode configuration of FIG. 2. The maximum cell voltage was chosen to be either 3.0 (FIG. 13) or 3.5 V (FIGS. 12 and 14). Cells were cycled four times at 1 mA/cm$^2$ followed by a two hour hold at the maximum voltage. Cells were then discharged prior to EIS analysis (20 kHz-100 mHz). EIS results for up to 25 consecutive duty cycles are shown corresponding to a total float time of 50 h at the maximum voltage.

FIG. 12 shows the complex impedance of a supercapacitor consisting of a carbon BP2000 anode and carbon BP2000 cathode in the electrolyte of the current invention (1.0 m NaPF6 in DME). The measurements were made in the two-electrode configuration of FIG. 2. The supercapacitor was cycled using duty cycle shown in FIG. 11. For each duty cycle the cell was cycled four times at 1 mA/cm$^2$ followed by a two hour hold at 3.5 V. The supercapacitor was then fully discharged and the complex impedance was measured. Complex impedance spectra are shown for up to 25 consecutive duty cycles corresponding to a total float time of 50 h at the maximum voltage. The impedance spectra are stable and reproducible after 50 h confirming that the electrolyte is stable under these conditions.

FIG. 13 shows the complex impedance of a supercapacitor consisting of a carbon BP2000 anode and carbon BP2000 cathode in a conventional electrolyte (1.0 m tetraethylammonium tetrafluoroborate in acetonitrile). The measurements were made in the two-electrode configuration of FIG. 2. The supercapacitor was cycled using duty cycle shown in FIG. 11. For each duty cycle the cell was cycled four times at 1 mA/cm$^2$ followed by a two hour hold at 3.0 V. The supercapacitor was then fully discharged and the complex impedance was measured. Complex impedance spectra are shown for up to 25 consecutive duty cycles corresponding to a total float time of 50 h at the maximum voltage. The impedance spectra are stable and reproducible after 50 h confirming that the electrolyte is stable under these conditions.

FIG. 14 shows the complex impedance of a supercapacitor consisting of a carbon BP2000 anode and carbon BP2000 cathode in a conventional electrolyte (1.0 m tetraethylammonium tetrafluoroborate in acetonitrile). The measurements were made in the two-electrode configuration of FIG. 2. The supercapacitor was cycled using duty cycle shown in FIG. 11. For each duty cycle the cell was cycled four times at 1 mA/cm$^2$ followed by a two hour hold at 3.5 V. The supercapacitor was then fully discharged and the complex impedance was measured. Complex impedance spectra are shown for up to 20 consecutive duty cycles corresponding to a total float time of 40 h at the maximum voltage. The changes in the impedance spectra show that the electrolyte is not stable under these conditions.

Figure 15:
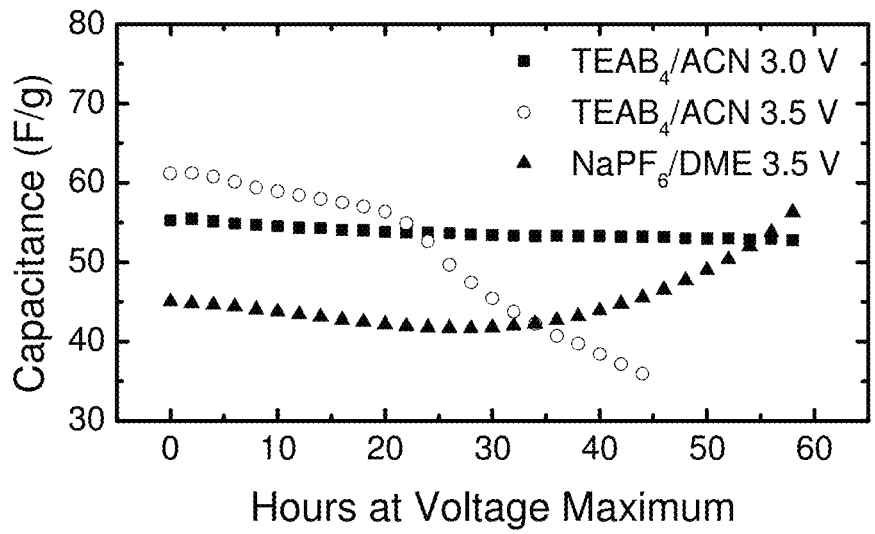
FIG. 15 is a plot of capacitance (F/g) vs. hours at voltage maximum for supercapacitors consisting of a carbon BP2000 anode and carbon BP2000 cathode in different electrolytes. The supercapacitors were cycled using the duty cycle shown in FIG. 11 with different values for the maximum cell voltage.

FIG. 15 shows the capacitance of supercapacitors consisting of a carbon BP2000 anode and carbon BP2000 cathode in different electrolytes. The supercapacitors were cycled using the duty cycle shown in FIG. 11 with different values for the maximum cell voltage. The capacitance values were derived from complex impedance measurements using the two-electrode cell configuration of FIG. 2. Example impedance curves are shown in FIGS. 12-14.

Figure 16:
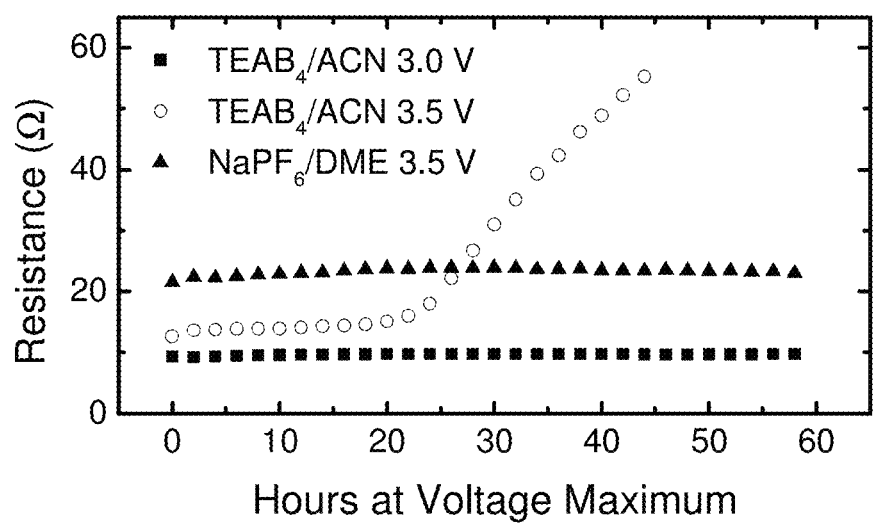
FIG. 16 shows the resistance ($\Omega$) vs. hours at maximum voltage for supercapacitors consisting of a carbon BP2000 anode and carbon BP2000 cathode in different electrolytes. The supercapacitors were cycled using the duty cycle shown in FIG. 11 with different values for the maximum cell voltage.

FIG. 16 shows the resistance of supercapacitors consisting of a carbon BP2000 anode and carbon BP2000 cathode in different electrolytes. The supercapacitors were cycled using the duty cycle shown in FIG. 11 with different values for the maximum cell voltage. The capacitance values were derived from complex impedance measurements using the two-electrode cell configuration of FIG. 2. Example impedance curves are shown in FIGS. 12-14.

This invention can be embodied in other forms without departing from the essential attributes thereof. Accordingly, reference should be made to the following claims to determine the scope of the invention.

We claim:

1. A supercapacitor, comprising:
   a negative electrode comprising carbon black and sodium carboxymethyl cellulose which does not intercalate sodium;
   a positive carbon-comprising electrode;
   an electrolyte composition comprising sodium hexafluorophosphate and a non-aqueous solvent comprising at least one selected from the group consisting of ethylene glycol dimethyl ether, diethylene glycol dimethyl ether, triethylene glycol dimethyl ether, and tetraethylene glycol dimethyl ether;
   wherein the supercapacitor has an electrochemical voltage window of from +0.0 V to 3.5 V (full cell voltage).

2. The supercapacitor of claim 1, wherein the electrolyte composition consists essentially of sodium hexafluorophosphate and a non-aqueous solvent comprising at least one selected from the group consisting of ethylene glycol dimethyl ether, diethylene glycol dimethyl ether, triethylene glycol dimethyl ether, and tetraethylene glycol dimethyl ether.

3. The supercapacitor of claim 1, wherein the electrolyte composition consists of sodium hexafluorophosphate and a non-aqueous solvent comprising at least one selected from the group consisting of ethylene glycol dimethyl ether, diethylene glycol dimethyl ether, triethylene glycol dimethyl ether, and tetraethylene glycol dimethyl ether.

4. The supercapacitor of claim 1, wherein the positive carbon-comprising electrode and the negative carbon-comprising electrode have a specific surface area of between 500 and 2000 m$^2$/g.

5. The supercapacitor of claim 1, wherein the positive carbon-comprising electrode and the negative carbon-comprising electrode comprise between 80 and 95 wt % carbon, and between 5 and 20 wt % binder.

6. The supercapacitor of claim 1, wherein the electrolyte has an electrochemical voltage window of from +0.05 V to 3.9 V vs. Na/Na$^+$.

7. The supercapacitor of claim 1, wherein the carbon black is high surface area carbon black Black Pearls® 2000.

* * * * *